United States Patent [19]
Goto et al.

[11] 4,112,877
[45] Sep. 12, 1978

[54] INTERNAL COMBUSTION ENGINE

[75] Inventors: Kenji Goto; Takao Niwa, both of Susono, Japan

[73] Assignee: Toyota Jidosha Kogyo Kabushiki Kaisha, Toyota, Japan

[21] Appl. No.: 733,909

[22] Filed: Oct. 19, 1976

[51] Int. Cl.² .................. F02B 19/10; F02B 19/18
[52] U.S. Cl. .................. 123/32 ST; 123/26; 123/75 B
[58] Field of Search ............ 123/32 ST, 26, 75 B

[56] References Cited
U.S. PATENT DOCUMENTS

| 3,974,818 | 8/1976 | Noguchi et al. | 123/32 ST |
| 3,976,039 | 8/1976 | Henault | 123/26 |
| 3,991,729 | 11/1976 | Notaro | 123/26 X |
| 4,029,075 | 6/1977 | Noguchi et al. | 123/32 ST |

Primary Examiner—Wendell E. Burns
Attorney, Agent, or Firm—Stevens, Davis, Miller & Mosher

[57] ABSTRACT

An internal combustion chamber including a main combustion chamber receiving an air-fuel mixture, an auxiliary combustion chamber in communication with the main combustion chamber, and an air supply source for supplying air to the auxiliary combustion chamber. During the suction stroke of an engine piston, an air-fuel mixture is introduced into the main and auxiliary combustion chambers, and additional air from the supply source is fed to the auxiliary combustion chamber.

12 Claims, 7 Drawing Figures

INTERNAL COMBUSTION ENGINE

BACKGROUND OF THE INVENTION

This invention relates to an internal combustion engine of the stratified-charge type to reduce harmful substances present in exhaust emissions.

Various methods have been proposed to reduce unburned harmful substances such as hydrocarbons (HC), carbon monoxide (CO) and nitrogen oxides (NOx) that are present in emissions of internal combustion engines. Among these engines is the stratified-charge engine that burns lean air-fuel mixtures. This is one of the most effective engines taking advantage of the fact that a mixture of a high air-fuel ratio, when combusted, leaves less harmful substances, particularly NOx, in exhaust emissions.

Due to its poor ignitability and low flame-propagation rate, a lean air-fuel mixture usually lowers thermal efficiency of the cycle and fails to produce large torque. Therefore, it was proposed to provide an engine having an auxiliary combustion chamber in addition to a main combustion chamber, so that the lean air-fuel mixture in the main combustion chamber can be ignited by the flame developed in the auxiliary combustion chamber. In one type of such engine, a richer mixture is fed through an auxiliary intake valve into the auxiliary combustion chamber where it is ignited by a spark plug; then a lean mixture in the main combustion chamber is burned by the flame propagating from the auxiliary combustion chamber. In another type, the auxiliary combustion chamber is disposed in the vicinity of the air-intake port, and a rich air-fuel mixture supply device, without an auxiliary intake valve, is provided to feed a rich mixture into the auxiliary combustion chamber during the intake stroke.

These conventional engines have the disadvantage of poor ignitability since the electric arc produced by the spark plug is blown out by the stream of air-fuel mixture forced from the auxiliary combustion chamber into the main combustion chamber during the combustion stroke. Also, such engines have been costly because of the need to provide an auxiliary fuel supply device, such as carburetor, to supply a rich mixture into the auxiliary combustion chamber.

SUMMARY OF THE INVENTION

An object of the present invention is to provide a stratified-charge internal combustion engine that effectively reduces the harmful substances in engine exhaust emissions without the above-mentioned disadvantages of the conventional engines.

This and other objects are obtained with the use of an auxiliary combustion chamber, which corresponds to a conventional auxiliary combustion chamber but admits substantially only air, and a main combustion chamber in which a rich air-fuel mixture is supplied.

DETAILED DESCRIPTION OF THE INVENTION

Figure 1:
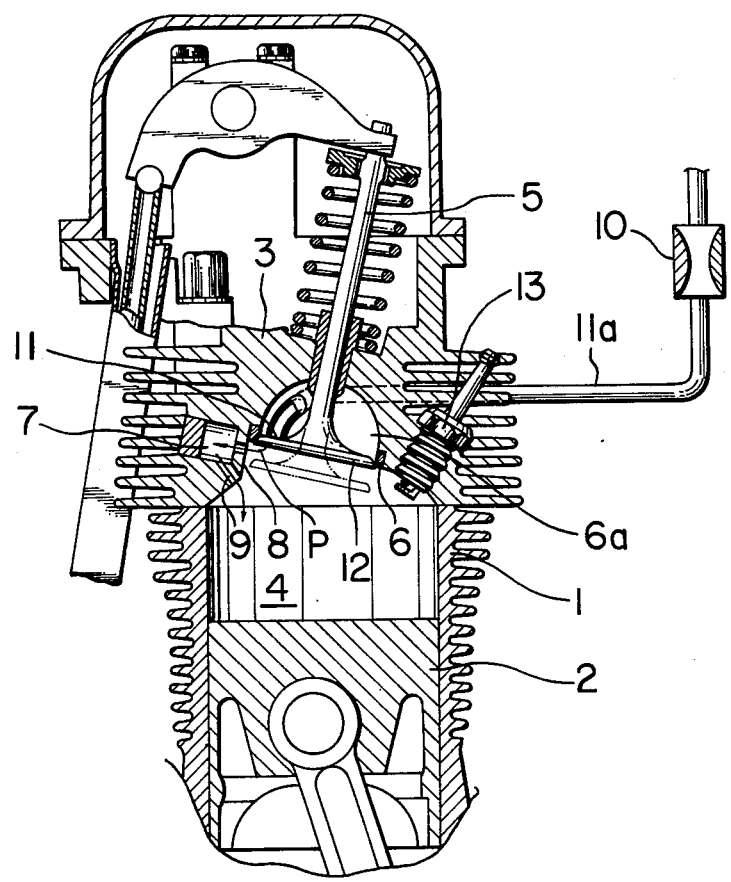
FIG. 1 is a cross-sectional view showing one embodiment of this invention including an air supply means.

With reference to FIG. 1, a main combustion chamber 4 is defined by a cylinder 1, a piston 2 reciprocating in the cylinder 1, and a cylinder head 3. The cylinder head 3 carries an intake valve 5 that is adapted to open and close an intake port 6 to supply a rich air-fuel mixture into the main combustion chamber 4. This rich mixture, prepared by adding fuel to sucked-in air in a carburetor or other means and supplied through an intake passage 6a, flows into the main combustion chamber 4 through the intake port 6.

An auxiliary combustion chamber 7 is integrally formed in the cylinder head 3. The auxiliary combustion chamber 7 is provided with two passages 8 and 9 interconnecting it with the main combustion chamber 4. An air-supply port 11, at the end of a pipe 11a extended from a means 10 for supplying air such as a common-type carburetor having a large venturi, opens in the vicinity of the edge of the intake port 6, and is adapted to be closed by the back face of the intake valve 5 when the valve 5 is in the closed position. The passage 8 opens toward a stream only of air supplied through the air-supply port 11 or a stream of air-fuel mixture containing plenty of the air from port 11. This stream, flowing through the intake port 6 into the main combustion chamber 4, is deflected by the head 12 of the intake valve 5 toward the passage 8. Preferably, the opening of the supply port 11 is as near as possible to the valve head 12 when the latter is closed, provided that there is some clearance between such opening and head 12 to avoid contact therebetween. A spark plug 13 is provided in the main combustion chamber 4 to ignite the air-fuel mixture therein.

The operation of the above-described embodiment is as follows. As the piston 2 in the cylinder 1 slides into its suction stroke, the intake valve 5 opens to admit a rich air-fuel mixture through the intake passage 6a into the main combustion chamber 4. At one time during the suction stroke, the air is sucked out from the air-supply means 10 through the air supply port 11. The stream of air injected from the air supply port 11 or the stream of air-fuel mixture containing plenty of the air from port 11 flows toward the passage 8, as indicated by the arrow P. The stream P scavenges the auxiliary combustion chamber 7, which then contains a mixture with a very high ratio of air or only air.

When the intake valve 5 closes and the piston 2 moves into the compression stroke, the rich mixture in the main combustion chamber 4 is forced through the passages 8 and 9 into the auxiliary combustion chamber 7. Consequently, the air-fuel ratio in the auxiliary combustion chamber 7 is somewhat raised. A little before the piston 2 reaches the top dead-center, the spark plug 13 ignites and burns the rich mixture in the main combustion chamber 4. Since this combustion takes place at a low air-fuel ratio, combustion temperature is relatively low and therefore production of NOx is inhibited. The flame produced in the main combustion chamber 4 spurts through the passages 8 and 9 into the auxiliary combustion chamber 7 to burn the lean mixture therein.

Usually a lean air-fuel mixture burns at slow rate, but when ignited by a strong flame, the combustion rate is increased, thus preventing the lowering of thermal efficiency of the engine cycle. This also permits burning a lean mixture at a relatively low temperature, which results in the inhibition of NOx production.

Following the combustion in the main combustion chamber 4 and the auxiliary combustion chamber 7, the piston 2 moves toward the bottom dead-center. Then the pressure inside the main combustion chamber 4 drops, and the combusted gas in the auxiliary combustion chamber 7 flows through the passages 8 and 9 into the main combustion chamber 4. Since this combusted gas results from the combustion of a lean air-fuel mixture in the auxiliary combustion chamber 7, it contains plenty of oxygen. Therefore, the oxygen re-combusts the unburned substances of the combusted gas in the main combustion chamber 4 during the expansion stroke of the piston 2 with the use of the high heat remaining in the main combustion chamber from the first combustion. When the piston 2 reaches near the bottom dead-center, the combusted gas is discharged through an exhaust valve not shown.

As can be understood from the above description, the present invention can effectively reduce the content of harmful NOx, HC and CO in exhaust emissions. In the conventional stratified-charge engine in which a lean mixture is supplied to the main combustion chamber and a rich mixture to the auxiliary combustion chamber, ignition by the spark plug is difficult due to the occurrence of complex turbulence in the auxiliary combustion chamber during the compression stroke. The present invention overcomes this difficulty by providing for freedom in the positioning of the spark plug, thus decreasing restrictions on the design of the entire engine. The conventional stratified-charge engine also requires two carburetors or other fuel supply means for the main and auxiliary combustion chambers. In contrast, the present invention requires only one carburetor or other fuel supply means. This contributes to cost reduction and simplification of the structure.

Figure 2:
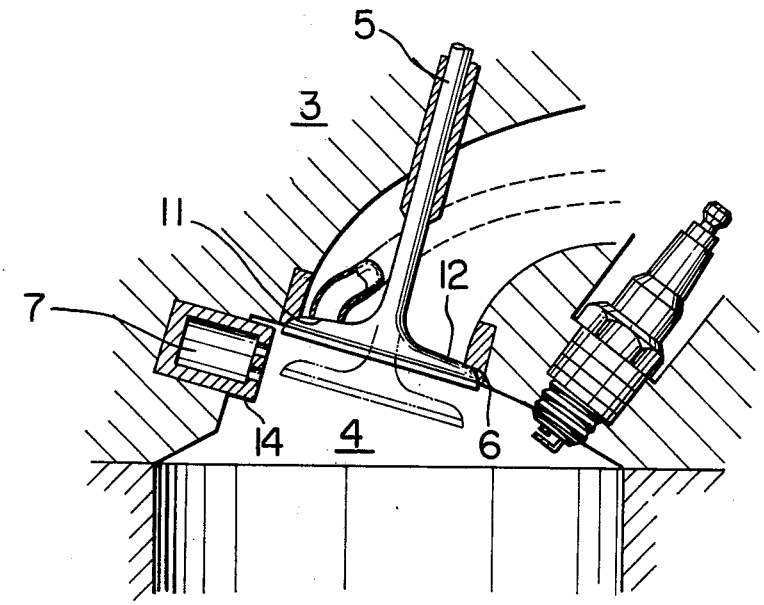
FIG. 2 is a cross-sectional view showing the principal part of another embodiment of this invention.

In the embodiment shown in FIG. 2, the auxiliary combustion chamber 7 includes an auxiliary chamber shell 14 that is inserted and held with a press-fit in a cavity formed in the cylinder head 3. The air supply port 11 of this embodiment is not always open, but is so designed as to be closed by the back of the valve head 12 of the intake valve 5 when it closes.

With this construction shown in FIG. 2, the manufacture of the auxiliary combustion chamber 7 is facilitated. This is because it is difficult to manufacture the auxiliary combustion chamber integrally with the cylinder 3 as shown in FIG. 1. The manufacture of the auxiliary combustion chamber 7 is facilitated with the construction shown in FIG. 2 because it is easy to manufacture the auxiliary chamber shell 14 separately in advance and press fit the shell in a cavity formed in the cylinder head. It also permits making only the auxiliary combustion chamber of special heat-resisting alloy, instead of making the entirety of the cylinder head 3 of such material. This lowers the manufacturing cost of the entire engine. Because the air supply port 11 is opened and closed by the valve head 12 of the intake valve 5, air is not discharged in the vicinity of the intake port 6 when the intake valve 5 closes. Therefore, the air-fuel ratio of the rich mixture in the vicinity of the intake port 6 is not changed.

Figure 3:
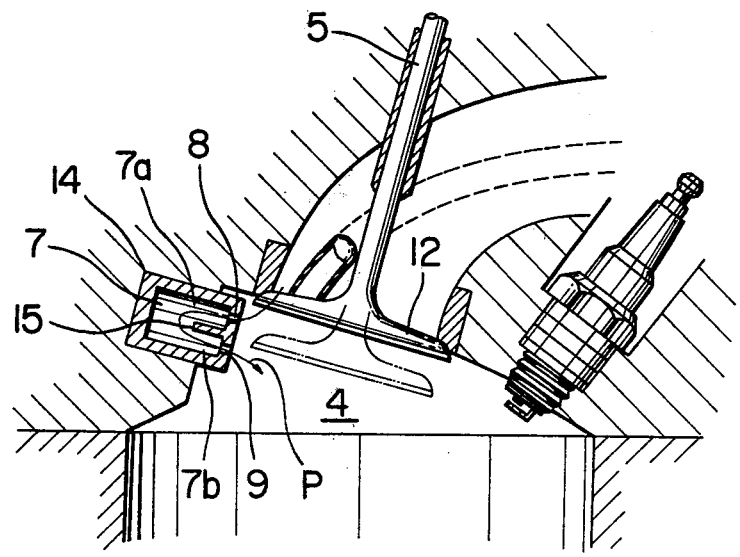
FIG. 3 is a cross-sectional view showing the principal part of still another embodiment of this invention, in which the auxiliary chamber is modified.

In another embodiment shown in FIG. 3, the auxiliary combustion chamber 7 also includes the auxiliary combustion chamber shell 14. However, a tongue 15, bisecting the auxiliary combustion chamber 7, projects into the shell 14 to more effectively scavenge the combusted gas of the preceding stroke remaining in the auxiliary combustion chamber 7. The passage 8 is provided in communication with one chamber or compartment 7b, both passages also communicating with the main combustion chamber 4.

In the embodiment of FIG. 3, the stream P containing plenty of air flows, as indicated by the arrow, through the passage 8 into the auxiliary chamber 7, then is discharged through the passage 9 into the main combustion chamber 4. By this means, the residual gas of the preceding stroke in the auxiliary combustion chamber 7 is surely scavenged, and the auxiliary combustion chamber 7 will contain a mixture with a high ratio of air or only air. Thus, the lean air-fuel mixture in the auxiliary combustion chamber 7 is surely combusted.

Figure 4:
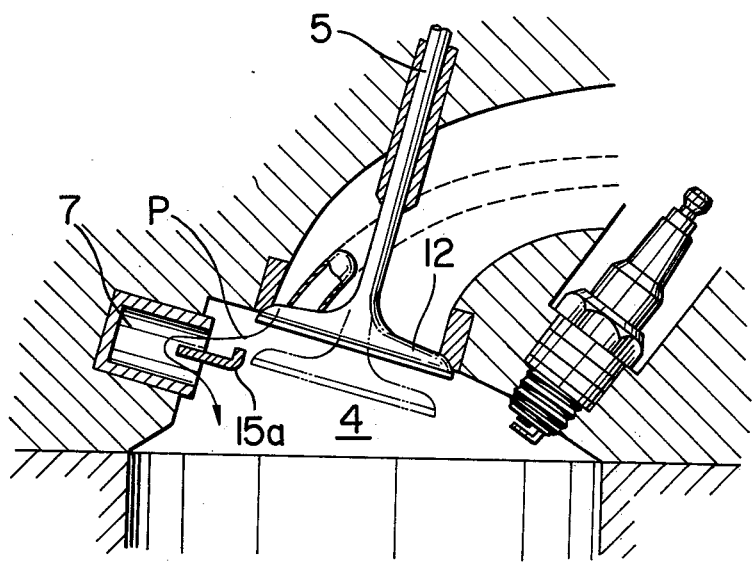
FIG. 4 is a cross-sectional view showing the principal part of yet another embodiment of this invention, in which the auxiliary chamber is further modified.

In still another embodiment shown in FIG. 4, a tongue 15a is provided instead of the tongue 15 of FIG. 3. One end of tongue 15a projects into the main combustion chamber 4 to come close to the periphery of the valve head 12 of the intake valve 5. This tongue 15a surely directs the stream P into the auxiliary combustion chamber 7 and then outside chamber 7 into chamber 4. The tongue 15a has the same function as that of the tonque 15 of FIG. 3, that is, to scavenge more effectively the combusted gas of the preceding stroke remaining in the auxiliary combustion chamber 7.

Preferably, the tongue 15a extends as near as possible to the outer periphery of valve head 12 when the latter is opened, provided that there is some clearance bewteen this tongue and the head to avoid contact therebetween. Also, the tongues 15 and 15a extend into chamber 7 to the extent that they cause a flow condition as shown by the arrows in FIGS. 3 and 4.

Figure 5:
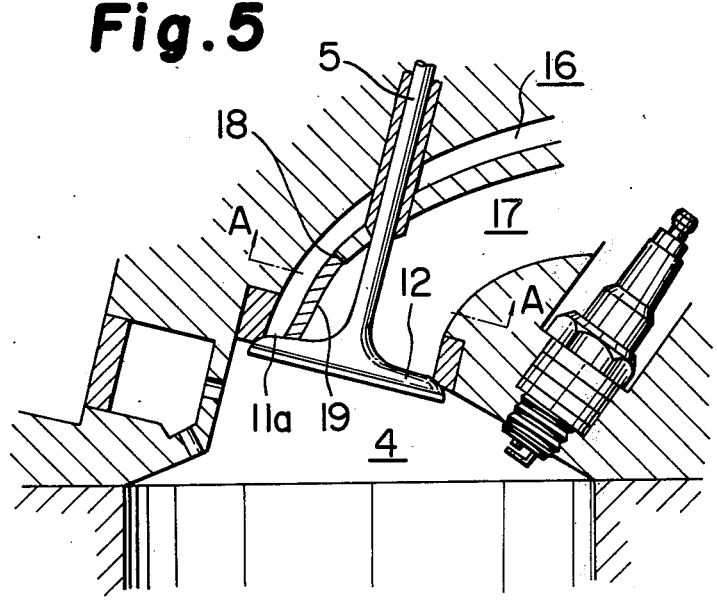
FIG. 5 is a cross-sectional view showing another embodiment of the present invention.
Figure 6:
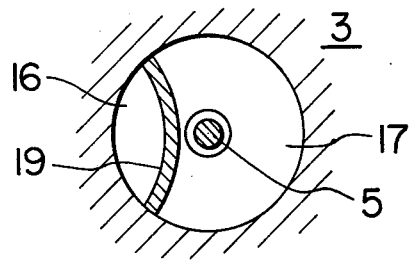
FIG. 6 is a cross-sectional view taken along the line A—A of FIG. 5.

FIGS. 5 and 6 show another embodiment of the air supply port. More specifically, a diaphragm 19 with an arched cross-section is fixed at an end 18 of an air passage or channel 16 opening to an intake passage 17, and one end of the diaphragm 19 is extended close to the valve head 12 of the intake valve 5 to form an air supply port 11a. This embodiment improves the feeding efficiency since the sucked-in stream flowing through the intake passage 17 is not disturbed.

Figure 7:
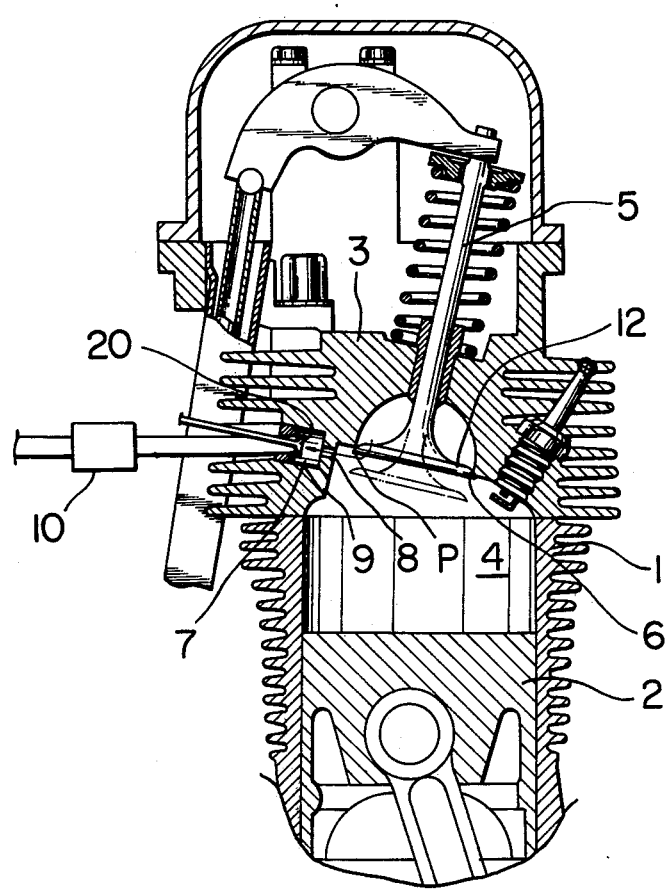
FIG. 7 is a cross-sectional view showing a further embodiment of the air-supply means.

FIG. 7 illustrates an embodiment in which an auxiliary valve 20 is provided in the auxiliary combustion chamber 7, which valve 20 is interconnected with the air supply means 10 and opened and closed by a valve-actuating mechanism not shown. This auxiliary valve 20 opens when the intake valve 5 opens and the piston 2 enters into the suction stroke, and closes when the intake valve 5 closes and the piston 2 is on the compression, expansion or exhaust strokes. In this embodiment of FIG. 7, the auxiliary combustion chamber 7 is scavenged well, as a consequence of which ignitability and combustion efficiency of the lean air-fuel mixture in the auxiliary chamber 7 are high.

What is claimed is:
1. An internal combustion engine having means to supply a lean mixture to the combustion chamber after combustion and prior to the exhaust stroke, said engine comprising:
(a) a first means for forming a main combustion chamber, including an intake port through which an air-fuel mixture is supplied to said main combustion chamber, an intake valve for opening and closing said intake port and having one side facing said main combustion chamber, (b) a second means for forming an auxiliary combustion chamber to hold said lean mixture and located immediately adjacent the intake valve, including passageways communicating said auxiliary combustion chamber only with said main combustion chamber;

(c) a spark plug located remote from said auxiliary combustion chamber and having a spark producing end facing the inside of said main combustion chamber, and a piston; and (d) means for providing additional air and introducing the additional air into said auxiliary combustion chamber during the suction stroke of said piston.

2. An internal combustion engine according to claim 1 wherein said means for introducing includes a pipe means having an opening near said intake port on the opposite side of said one side of said intake valve, said valve deflecting a stream including the additional air and the air-fuel mixture towards said auxiliary combustion chamber during the suction stroke of said piston, and wherein said passageways include a first passage directed to transfer the stream into said auxiliary combustion chamber and a second passage directed to transfer the contents of said auxiliary combustion chamber into said main combustion chamber.

3. An internal combustion engine according to claim 2 wherein said opening of said pipe means is spaced apart from said opposite side of said valve when said valve closes said intake port.

4. An internal combustion engine according to claim 2 wherein said opening of said pipe means is closed by said opposite side of said valve when said valve is closed.

5. An internal combustion engine according to claim 4 wherein said first means for forming further includes a cylinder head having a cavity, and said second means for forming includes a shell providing said auxiliary combustion chamber and held in said cavity.

6. An internal combustion engine according to claim 5 wherein said shell is made of a heat-resistant alloy.

7. An internal combustion engine according to claim 6 wherein said shell is held in said cavity by a press fit.

8. An internal combustion engine according to claim 2 wherein said first means for forming further includes a cylinder head having a cavity, and said second means for forming includes a shell providing said auxiliary combustion chamber and held in said cavity, said shell including a tongue projecting into said auxiliary combustion chamber to form first and second compartments, and scavenge the contents, therein, said first passage communicating with said first compartment and said second passage communicating with said second compartment.

9. An internal combustion engine according to claim 8 wherein said shell is made of a heat-resistant alloy.

10. An internal combustion engine according to claim 2 wherein said first means for forming further includes a cylinder head having a cavity, and said second means for forming includes a shell providing said auxiliary combustion chamber and held in said cavity, said shell including a tongue projecting into said main combustion chamber close to the periphery of said valve to aid further in directing the stream into said auxiliary combustion chamber.

11. An internal combustion engine according to claim 2 wherein said pipe means includes a cylinder head and a diaphragm having an arched cross-section, spaced apart from said head, to form an air channel therebetween.

12. An internal combustion engine according to claim 1, wherein said means for introducing includes a pipe means having an aperture into said auxiliary combustion chamber, and further including an auxiliary valve within said auxiliary combustion chamber for opening and closing said aperture, said auxiliary valve opening said aperture when said intake valve opens said intake port and closing said aperture when said intake valve closes said intake port.

* * * * *